(12) United States Patent
Sebire et al.

(10) Patent No.: US 11,916,799 B2
(45) Date of Patent: Feb. 27, 2024

(54) REDUCING LATENCY AT PACKET DATA CONVERGENCE PROTOCOL (PDCP) IN NEW RADIO

(71) Applicant: NOKIA TECHNOLOGIES OY, Espoo (FI)

(72) Inventors: Benoist Pierre Sebire, Tokyo (JP); Samuli Heikki Turtinen, Li (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 203 days.

(21) Appl. No.: 17/283,812

(22) PCT Filed: Oct. 12, 2018

(86) PCT No.: PCT/US2018/055614
§ 371 (c)(1),
(2) Date: Apr. 8, 2021

(87) PCT Pub. No.: WO2020/076338
PCT Pub. Date: Apr. 16, 2020

(65) Prior Publication Data
US 2022/0006753 A1    Jan. 6, 2022

(51) Int. Cl.
*H04L 47/27*    (2022.01)
*H04L 47/22*    (2022.01)

(52) U.S. Cl.
CPC .............. *H04L 47/27* (2013.01); *H04L 47/22* (2013.01)

(58) Field of Classification Search
CPC ................................ H04L 47/27; H04L 47/22
See application file for complete search history.

(56) References Cited

U.S. PATENT DOCUMENTS

| | | | |
|---|---|---|---|
| 2016/0239463 A1* | 8/2016 | Song | G06F 17/142 |
| 2017/0064679 A1* | 3/2017 | Zhang | H04L 47/624 |

(Continued)

FOREIGN PATENT DOCUMENTS

| | | |
|---|---|---|
| CN | 101682864 A | 3/2010 |
| CN | 102340832 A | 2/2012 |

(Continued)

OTHER PUBLICATIONS

First Examination Report issued in corresponding Indian Patent Application No. 202147020530 dated Feb. 24, 2022.
(Continued)

*Primary Examiner* — Chi H Pham
*Assistant Examiner* — Weibin Huang
(74) *Attorney, Agent, or Firm* — SQUIRE PATTON BOGGS (US) LLP

(57) ABSTRACT

Systems, methods, apparatuses, and computer program products for reducing latency in 5G/NR are provided. One method may include determining, by a network node, to apply selective reordering of one or more data units received at a user equipment, and indicating the decision to apply selective reordering to the user equipment. The selective reordering temporarily alters packet data convergence protocol window behaviour in the user equipment such that a packet data convergence protocol layer in the user equipment is caused to deliver, to upper layer(s), the stored data units with an associated count value that is less than the count value associated with a data unit at the user equipment and/or the stored data units with consecutively associated count values starting from the count value associated with a data unit at the user equipment.

21 Claims, 4 Drawing Sheets

(56) References Cited

U.S. PATENT DOCUMENTS

| | | | | |
|---|---|---|---|---|
| 2017/0171060 A1* | 6/2017 | Liu | .......................... | H04L 67/60 |
| 2019/0044880 A1* | 2/2019 | Yi | .......................... | H04L 47/624 |
| 2019/0053099 A1* | 2/2019 | Kim | .................. | H04W 28/0278 |
| 2020/0059817 A1* | 2/2020 | Baek | ................. | H04W 28/0273 |
| 2020/0245401 A1* | 7/2020 | Ingale | ................... | H04W 36/14 |
| 2020/0374690 A1* | 11/2020 | Yao | ....................... | H04W 12/03 |

FOREIGN PATENT DOCUMENTS

| | | |
|---|---|---|
| CN | 106537882 A | 3/2017 |
| CN | 107852768 A | 3/2018 |
| WO | WO 2015/113497 A1 | 8/2015 |
| WO | WO 2015/174658 A1 | 11/2015 |
| WO | 2017/012668 A1 | 1/2017 |

OTHER PUBLICATIONS

International Search Report and Written Opinion dated May 9, 2019 corresponding to International Patent Application No. PCT/US2018/055614.

3GPP TS 36.322, 3rd Generation Partnership Project; Technical Specification Group Radio Access Network; Evolved Universal Terrestrial Radio Access (E-UTRA); Radio Link Control (RLC) protocol specification, (Release 15), V15.0.1, Apr. 2018.

R3-131538, "LS on Confirmation on RAN2 Assumption on SCE", 3GPP RAN-WG3 Meeting #81, Rel-12, Aug. 19, 2013.

LG Electronics, R2-082876, "Addition of a duplicate discard window", Change Request 36.323, 3GPP TSG-RAN2 Meeting #62, May 5, 2008.

Nokia, Nokia Shanghai Bell, R2-1804913, "QoS Flow Remapping", 3GPP TSG-RAN WG2 Meeting #101bis, Apr. 16, 2018.

Ericsson et al., R2-086314, "PDCP 'in-sequence delivery and duplicate elimination' always on", Change Request 36.323, 3GPP TSG-RAN2 Meeting #64, Nov. 10, 2008.

3GPP TS 36.323, 3rd Generation Partnership Project; Technical Specification Group Radio Access Network; Evolved Universal Terrestrial Radio Access (E-UTRA); Packet Data Convergence Protocol (PDCP) specification, (Release 14), V14.5.0, Dec. 2017.

3GPP TS 38.323, 3rd Generation Partnership Project; Technical Specification Group Radio Access Network; NR; Packet Data Convergence Protocol (PDCP) specification, (Release 15), V15.1.0, Mar. 2018.

Communication pursuant to Article 94(3) EPC dated Jun. 20, 2023 corresponding to European Patent Application No. 18800365.1.

First Office Action dated Oct. 28, 2023 corresponding to Chinese Patent Application No. 201880100100.8, with English summary thereof.

Hui Liu et al., "Research and design of PDCP layer in LTE protocol stack," LTE, PDCP, Journal of Chongqing University of Posts and Telecommunications (Natural Science Edition), vol. 23, No. 1, Feb. 2011.

Yuan-xin Sun et al., "Function of PDCP Sublayer in LTE System," LTE, PDCP, Modern Electronics Technique, vol. 34, No. 7, Apr. 2011.

LT Electronics Inc. (PDCP rapporteur), "38.323v0.2.0 NR PDCP specification," R2-1707507, 3GPP TSG-RAN WG2 NR #99, Berlin, Germany, Aug. 21-Aug. 25, 2017, Jul. 19, 2017.

* cited by examiner

REDUCING LATENCY AT PACKET DATA CONVERGENCE PROTOCOL (PDCP) IN NEW RADIO

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to 5G low latency access methods.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in E-UTRAN or eNB in LTE) may be named gNB when built on NR radio and may be named NG-eNB when built on E-UTRA radio.

SUMMARY

One embodiment is directed to an apparatus that may include at least one processor and at least one memory comprising computer program code. The at least one memory and computer program code configured, with the at least one processor, to cause the apparatus at least to determine to apply selective reordering of data units received at a user equipment, and to indicate the decision to apply selective reordering to the user equipment. The selective reordering temporarily alters packet data convergence protocol window behaviour in the user equipment such that a packet data convergence protocol layer in the user equipment delivers, to upper layer(s), at least one of stored data units with an associated count value that is less than the count value associated with a data unit at the user equipment or stored data units with consecutively associated count values starting from the count value associated with a data unit at the user equipment.

Another embodiment is directed to a method that may include determining, by a network node, to apply selective reordering of data units received at a user equipment, and indicating the decision to apply selective reordering to the user equipment. The selective reordering temporarily alters packet data convergence protocol window behaviour in the user equipment such that a packet data convergence protocol layer in the user equipment delivers, to upper layer(s), at least one of stored data units with an associated count value that is less than the count value associated with a data unit received at the user equipment or stored data units with consecutively associated count values starting from the count value associated with a data unit received at the user equipment.

Another embodiment is directed to an apparatus, which may include determining means for determining to apply selective reordering of data units received at a user equipment, and indicating means for indicating the decision to apply selective reordering to the user equipment. The selective reordering temporarily alters packet data convergence protocol window behaviour in the user equipment such that a packet data convergence protocol layer in the user equipment delivers, to upper layer(s), at least one of stored data units with an associated count value that is less than the count value associated with a data unit received at the user equipment or stored data units with consecutively associated count values starting from the count value associated with a data unit received at the user equipment.

Another embodiment is directed to an apparatus that may include at least one processor and at least one memory comprising computer program code. The at least one memory and computer program code configured, with the at least one processor, to cause the apparatus at least to receive a data unit from at least one lower layer, and to determine whether the received data unit is flagged for selective reordering. When it is determined that the received data unit is flagged for selective reordering, the at least one memory and computer program code may be configured, with the at least one processor, to cause the apparatus at least to deliver, to at least one upper layer, at least one of stored data units with an associated count value that is less than the count value associated with the data unit flagged for selective reordering received at the user equipment or stored data units with consecutively associated count values starting from the count value associated with the data unit flagged for selective reordering received at the user equipment.

Another embodiment is directed to a method that may include receiving a data unit from at least one lower layer, and determining whether the received data unit is flagged for selective reordering. The method may also include, when it is determined that the received data unit is flagged for selective reordering, delivering, to at least one upper layer, at least one of stored data units with an associated count value that is less than the count value associated with the data unit flagged for selective reordering received at the user equipment or stored data units with consecutively associated count values starting from the count value associated with the data unit flagged for selective reordering received at the user equipment.

Another embodiment is directed to an apparatus that may include receiving means for receiving a data unit from at least one lower layer, and determining means for determining whether the received data unit is flagged for selective reordering. When it is determined that the received data unit is flagged for selective reordering, the apparatus may further include transmitting means for delivering, to at least one upper layer, at least one of stored data units with an associated count value that is less than the count value associated with the data unit flagged for selective reordering received at the user equipment or stored data units with consecutively associated count values starting from the count value associated with the data unit flagged for selective reordering received at the user equipment.

BRIEF DESCRIPTION OF THE DRAWINGS

For proper understanding of example embodiments, reference should be made to the accompanying drawings, wherein.

DETAILED DESCRIPTION

Figure 1A:
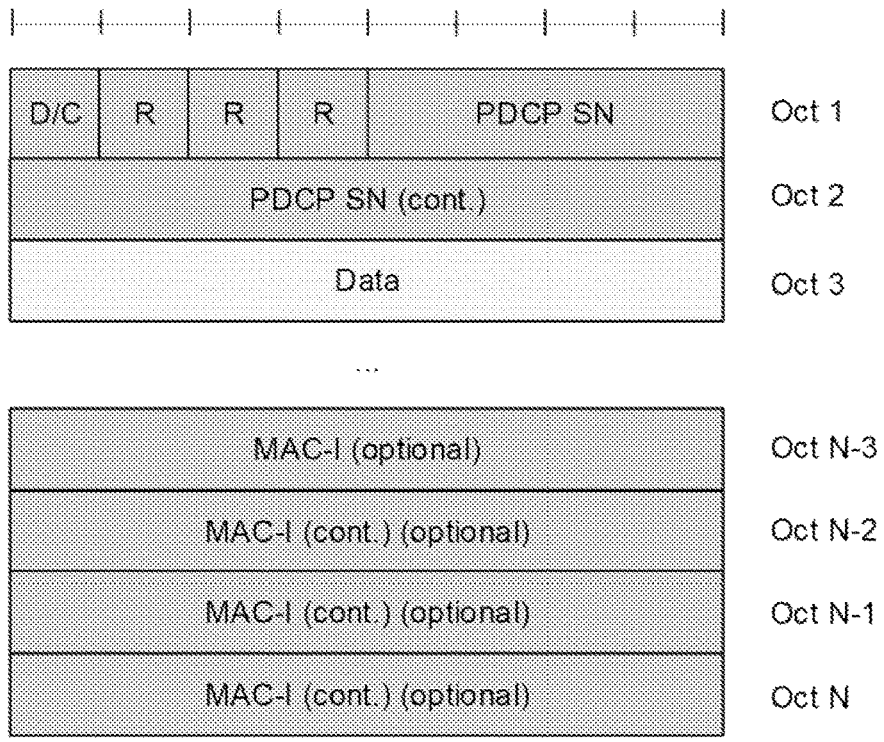
FIG. 1a illustrates an example PDCP data PDU format, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for reducing latency in 5G/NR, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

In LTE, because the occurrence of hybrid automatic repeat request (HARQ) retransmissions and radio link control (RLC) retransmissions results in having RLC protocol data units (PDUs) reaching the peer entity out-of-sequence, RLC takes care of re-ordering and delivering RLC service data units (SDUs) to packet data convergence protocol (PDCP) in ascending order of the RLC sequence number (SN) for both RLC-unacknowledged mode (UM) and RLC-acknowledged mode (AM) bearers. Further, because HARQ cannot guarantee a lossless delivery of SDUs, some gaps in the sequence of RLC SDUs delivered to the PDCP may occur on RLC-UM bearers. It is, however, assumed that the gap will be short enough to avoid hyper frame number (HFN) de-synchronisation, i.e., that less than the PDCP SN-space of PDCP PDUs are lost (e.g., 128 or 4096 PDCP PDUs for 7 bits or 12 bits SN respectively).

Since RLC-AM guarantees lossless delivery, it can be expected that no losses are tolerated by PDCP on RLC-AM bearers. However, the mechanism agreed to handle re-establishment should first be considered. At re-establishment, the reordering buffers are flushed and RLC delivers RLC SDUs to PDCP in ascending order of the RLC SN. One fundamental difference between RLC-UM and RLC-AM is that, while PDCP SNs are reset in the target eNB for RLC-UM bearers, they are maintained for RLC-AM bearers to provide in-sequence delivery and duplicate detection also during handover with data forwarding. In order to do so, first a reordering window at handover was agreed in 3GPP TS 3GPP TS 36.323v810, then it was changed to "duplicate discard window" at handover (3GPP R2-082876) and finally it was agreed to apply the behaviour always and remove the flush_timer (3GPP R2-086314). As a result, when the UE receives a PDCP SDU, it delivers it to higher layer together with all PDCP SDUs with lower SNs regardless of possible gaps and in ascending order of the SNs. In particular, 3GPP TS 36.323 specifies that, when the UE receives a PDCP SDU, the UE delivers to upper layers in ascending order of the associated count value, such that all stored PDCP SDU(s) with an associated count value less than the count value associated with the received PDCP SDU are delivered and/or all stored PDCP SDU(s) with consecutively associated count value(s) starting from the count value associated with the received PDCP SDU.

In effect, a receive window that was originally introduced to cope with possible forwarding losses over X2 interface during handover now also handles losses during normal operation. PDCP can then handle losses for RLC-AM bearers as long as less than PDCP SN-space consecutive PDCP PDUs are lost (e.g., 4096 or 32768 PDCP PDUs for 12 bits or 15 bits SN respectively).

In NR, the buffering in radio protocols was streamlined. In particular, reordering of PDUs takes place at PDCP and RLC is limited to reordering possible segments. To prevent the receiver from stalling indefinitely in case of gaps, a reordering timer (t-Reordering) was introduced in 3GPP TS 38.323. More specifically, 3GPP TS 38.323, specifies that, when the t-Reordering timer expires, the receiving PDCP entity may deliver to upper layers in ascending order of the associated count value after performing header decompression, if not decompressed before: all stored PDCP SDU(s) with associated count value(s)<RX_REORD, and/or all stored PDCP SDU(s) with consecutively associated count value(s) starting from RX_REORD. Also, when the t-Reordering timer expires, the receiving PDCP entity may update RX_DELIV to the count value of the first PDCP SDU which has not been delivered to upper layers, with count value>=RX_REORD. If RX_DELIV<RX_NEXT, RX_REORD is updated to RX_NEXT, and t-Reordering timer is started.

Figure 1B:
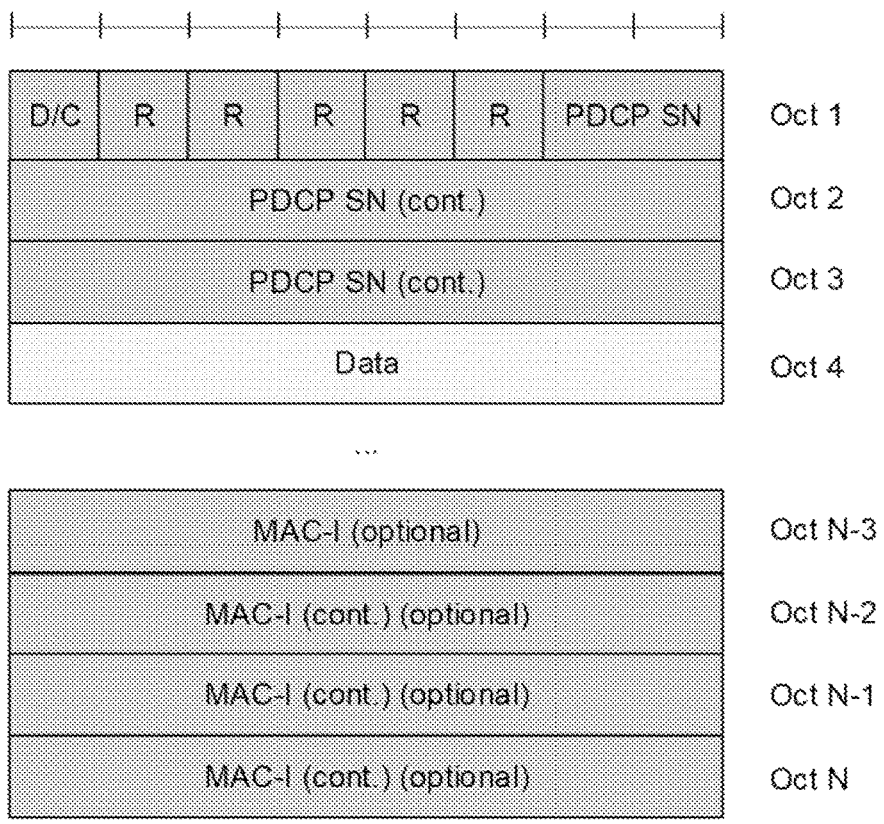
FIG. 1b illustrates another example PDCP data PDU format, according to an embodiment.

FIGS. 1a and 1b illustrate examples of PDCP PDU formats, which contain multiple R bits. FIG. 1a illustrates an example PDCP data PDU format with 12 bits PDCP SN. FIG. 1b illustrates an example PDCP data PDU format for data radio bearers (DRBs) with 18 bits PDCP SN.

There are several reasons why the receiver needs to be able to cope with gaps in the receive SN sequence of PDCP PDUs. First, during mobility events, forwarding losses can occur due to possible congestion. Although this might be a rare event, the radio protocols would still need to handle such a case. This motivated the 3GPP Rel-8 behaviour in LTE and was later confirmed for dual connectivity (DC)/Xn, where packet loss over Xn can be assumed to be rare in reasonable load conditions but cannot be guaranteed in high load or overload situations. It is possible that the Xn delivers packets in the wrong order, but this is assumed to be rare in reasonable load conditions. Assuming, as an example, that Xn re-uses the X2 user plane (UP) protocol stack as defined in 3GPP TS 36.424. GPRS tunnelling protocol user plane (GTP-U) as defined in TS 29.281 provides the possibility to indicate sequence numbers which enables the receiving node to perform reordering.

Second, quality of service (QoS) flow handling in NR can also introduce losses at a radio bearer level, such as during QoS flow relocation if packets on the old bearer are discarded and when a QoS flow is released.

Therefore, NR may need to handle gaps in the receive SN sequence of PDCP PDUs more frequently than in LTE. Unfortunately, however, the streamlining of operations makes the handling of such gaps cumbersome.

In the following, one possible example for handover is provided for purposes of illustration. In this example, before handover, PDUs 1, 2, 3, 4, and 5 are sent to the UE in the downlink, but 3 and 4 fails. The PDCP buffer at the UE, therefore, contains PDU 5. PDUs 1 and 2 were received in order and, thus, delivered to the upper layers. At handover, PDUs 3 and 4 are forwarded by the source to the target but PDU 3 is lost. In the target, PDU 4, 6, and 7 are sent to the UE. Then, what happens in the UE depends on the PDCP reordering window. In LTE, when receiving PDU 4, both PDUs 4 and 5 are delivered to the upper layers (or the corresponding SDUs to be more specific), ignoring the gap created by the missing PDU 3. In NR, receiving PDU 4 and 5 does not move the PDCP window as it is stalled due to the missing PDU 3. Accordingly, this appears to be a flaw for NR when compared to LTE.

Therefore, example embodiments are configured to allow a NR base station or gNB to temporarily alter the PDCP window behaviour in the UE. For example, in an embodiment, when the gNB requires it, the PDCP layer in the UE delivers, to upper layers, all stored PDCP SDU(s) with an associated count value less than the count value associated with the received PDCP SDU and/or all stored PDCP SDU(s) with consecutively associated count value(s) starting from the count value associated with the received PDCP SDU. According to one embodiment, this may be a one-shot-operation and, once completed, the window would then switch back to the agreed behaviour for NR. In an embodiment, one R bit in the PDCP header may be used to order such an action at the UE side. Alternatively, in an embodiment, PDCP SN or corresponding count value for which to perform the above behaviour once such PDCP PDU is received may be signaled via radio resource control (RRC) signalling, e.g., in the handover (HO) command or in a PDCP control PDU.

Referring again to the handover example introduced above in which PDU 3 is missing, according to example embodiments, the target network node (e.g., target gNB) may use an R bit in the PDCP PDU 4, may use a PDCP control PDU to signal SN 4 or corresponding count value, and/or may include SN 4 or corresponding count value in the handover command, to indicate the change in the PDCP window behaviour.

It should be noted that following the LTE behaviour is not always a viable solution since the RLC in NR does not provide in-sequence delivery of PDCP PDUs as in LTE. This would lead to unnecessary losses in the receiver whenever PDCP PDUs are received out-of-order (as moving the window would then lead to discard of late PDUs). As an example of why applying the LTE solution directly to NR would not lead to targeted behaviour, reference may be made again to the same handover example above in which PDU 3 is missing. In the target, PDU 4, 6 and 7 are sent to the UE but since the PDCP PDUs were received out-of-order, PDU 7 is the first one delivered to the PDCP by the RLC entity. PDUs 5 and 7 are delivered to upper layers, but PDU 4 and 6 will be unnecessarily discarded after they are delivered to PDCP by the RLC entity. Hence, example embodiments allow for ignoring only the gaps known and/or controlled by the network and does not lead to any unnecessary additional losses that would occur by applying the LTE solution or other conventional solutions.

With the ability to alter the PDCP window behaviour, the gNB is able to reduce latency in the situation where PDCP SNs are known to be missing. This results in better mobility and QoS flow relocation.

Figure 2:
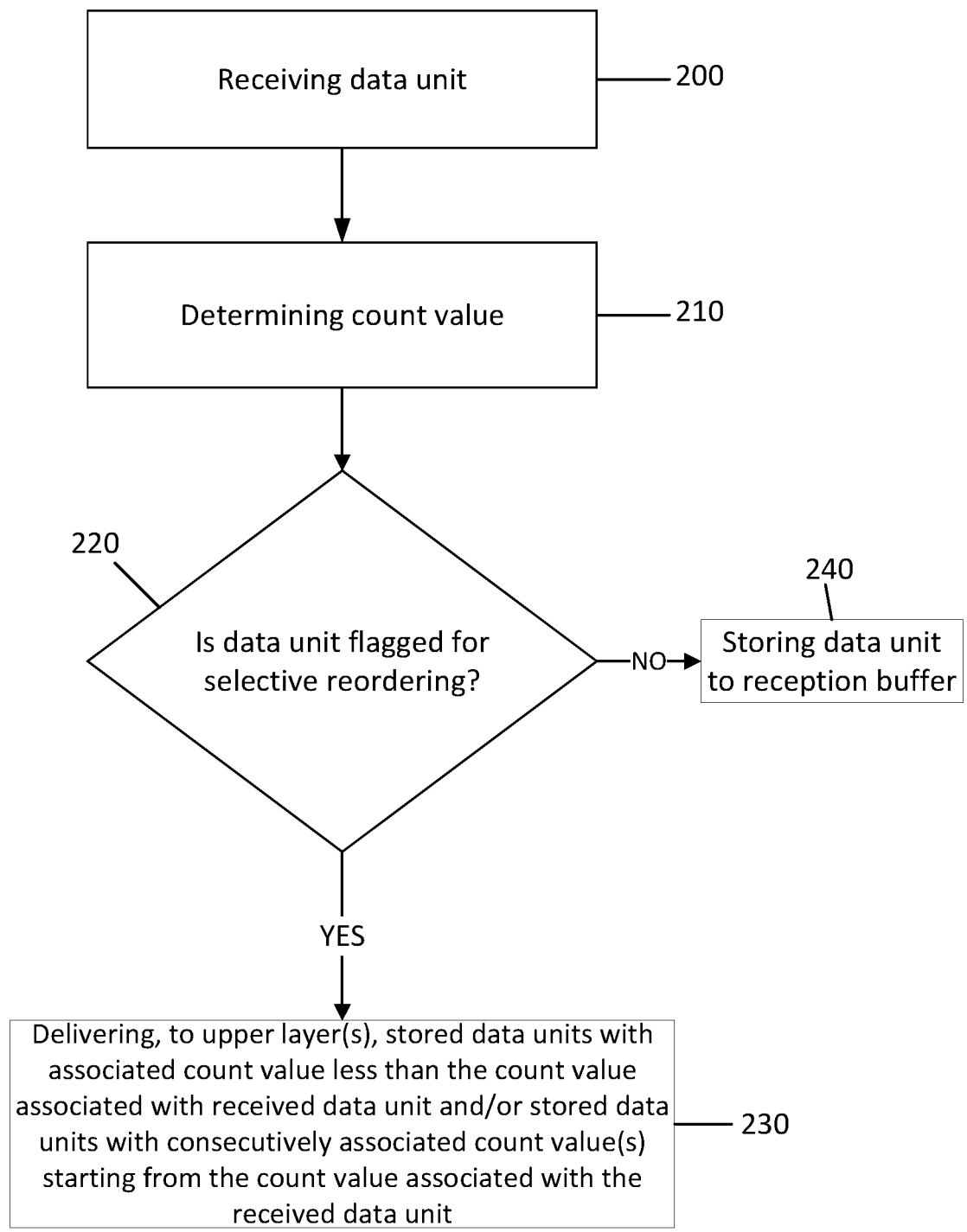
FIG. 2 illustrates an example flow diagram of a method, according to an embodiment.

FIG. 2 illustrates an example flow diagram of a method for handling data reception at a receiver in NR, according to one embodiment. In certain embodiments, the receiver performing the method of FIG. 2 may be a PDCP entity and/or UE. According to an embodiment, the method of FIG. 2 may include, at 200, receiving a data unit, e.g., a PDCP data PDU, from lower layer(s). In some embodiments, the method may then include, at 210, determining the count value (RCVD_COUNT) of the received data unit. According to an embodiment, the determining 210 may include:

if RCVD_SN<SN(RX_DELIV)−Window_Size, then RCVD_HFN=HFN(RX_DELIV)+1;

if RCVD_SN>=SN(RX_DELIV)+Window_Size, then RCVD_HFN=HFN(RX_DELIV)−1; or if RCVD_HFN=HFN(RX_DELIV), then RCVD_COUNT=[RCVD_HFN, RCVD_SN], where RX_DELIV is the State Variable, HFN(State Variable) is the HFN part (i.e., the number of most significant bits equal to HFN length) of the State Variable, SN(State Variable) is the SN part (i.e., the number of least significant bits equal to PDCP SN length) of the State Variable, RCVD_SN is the PDCP SN of the received PDCP Data PDU, included in the PDU header, RCVD_HFN is the HFN of the received PDCP Data PDU calculated by the receiving PDCP entity, and RCVD_COUNT is the count of the received PDCP Data PDU=[RCVD_HFN, RCVD_SN].

After determining the count value of the received data unit, in some embodiments, the method may include performing deciphering and integrity verification of the data unit using COUNT=RCVD_COUNT. If the integrity verification fails, then the method may include indicating the integrity verification failure to upper layer and discarding the data unit. In one embodiment, if RCVD_COUNT<RX_DELIV or if the data unit with COUNT=RCVD_COUNT has been received before, the method may include storing the data unit to a reception buffer at 240. According to certain embodiments, the method may include determining, at 220, whether the data unit is flagged for selective reordering. In other words, this may include determining whether the count value of the received data unit is flagged for selective reordering. In an embodiment, the received data unit may be flagged for selective reordering by using an R bit in the (PDCP) header of the received data unit. In a further embodiment, a PDCP SN or corresponding count value based on which to perform the selective reordering once the data unit is received may be signaled via RRC signalling, e.g., in a HO command or in a PDCP control PDU.

When it is determined that the count of the received data unit (i.e., RCVD_COUNT) was flagged for selective reordering, then the method may include, at 230, delivering to upper layer(s) all stored data units with an associated count value that is less than the count value associated with the data unit flagged for selective reordering and/or all stored data units with consecutively associated count value(s) starting from the count value associated with the data unit flagged for selective reordering. In an embodiment, the stored data units may be PDCP SDU(s). According to an embodiment, the delivering 230 may include delivering, to the upper layer(s), the stored data units is ascending order of the associated count value, for example, after performing header decompression. In one example embodiment, after delivering the stored data units, the method may include updating RX_DELIV to the count value of the first data unit which has not been delivered to upper layers, with COUNT value>RCVD_COUNT, and returning to the normal behaviour before the selective reordering.

Figure 3:
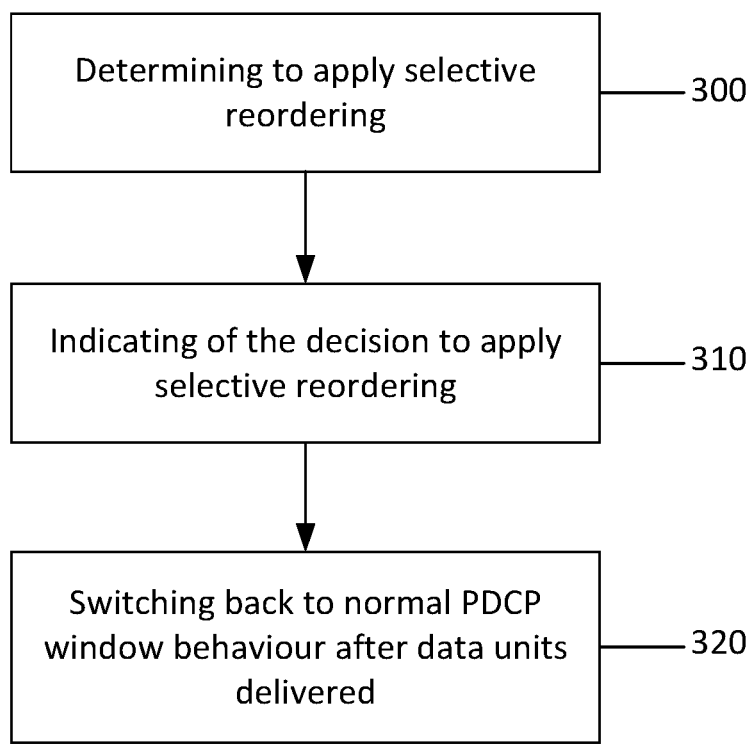
FIG. 3 illustrates an example flow diagram of a method, according to an embodiment.

FIG. 3 illustrates an example flow diagram of a method for reducing latency in NR, according to one embodiment. In certain example embodiments, the flow diagram of FIG. 3 may be performed by a network entity or network node in a 3GPP communication system, such as LTE or 5G NR. For instance, in some example embodiments, the method of FIG. 3 may be performed by a base station, eNB, gNB, or the like in a LTE, 5G or NR system.

In one embodiment, the method of FIG. 3 may include, at 300, determining or deciding to apply selective reordering of one or more data units transmitted to a receiving (PDCP) entity or UE. According to one embodiment, the method may then include, at 310, indicating to the UE that the data unit(s) is flagged for selective reordering. In one example, the data unit(s) may be a PDCP data PDU or SDU. In an embodiment, the application of selective reordering temporarily alters the PDCP window behavior in the UE such that a PDCP layer in the UE is caused to deliver, to upper layer(s), all stored data units with an associated count value that is less than the count value associated with the data unit flagged for selective reordering and/or all stored data units with consecutively associated count value(s) starting from the count value associated with the data unit flagged for selective reordering.

In one embodiment, the indicating 310 may include flagging the data unit(s) for selective reordering using an R bit in the (PDCP) header of the data unit(s). In another example embodiment, the indicating 310 may include signaling, via RRC signaling, a PDCP SN or corresponding count value based on which to perform the selective reordering once the data unit(s) is received by the UE, e.g., in a HO command or in a PDCP control PDU. According to certain embodiments, the method may also include, at 320, switching the PDCP window behaviour back to the normal behaviour prior to the selective reordering.

Figure 4A:
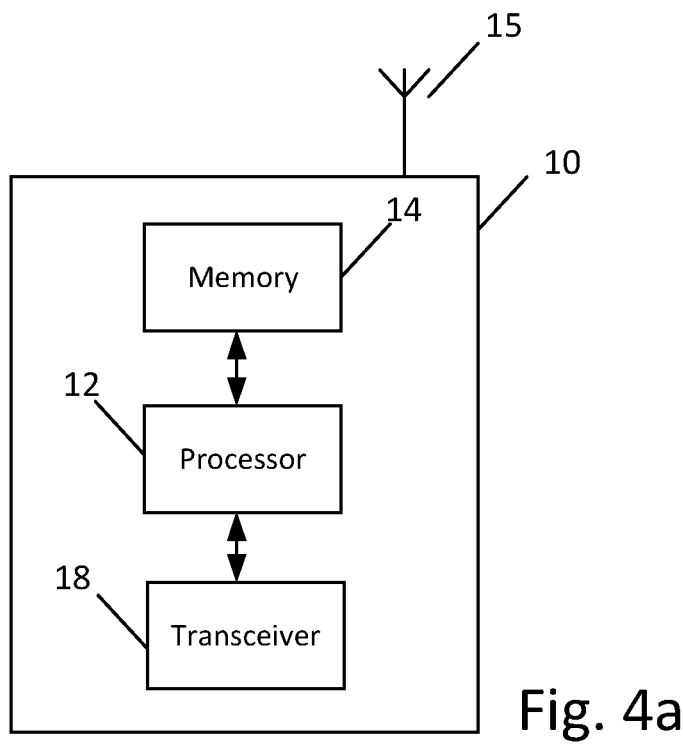
FIG. 4a illustrates an example block diagram of an apparatus, according to an embodiment.

FIG. 4a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), WLAN access point, associated with a radio access network, such as a LTE network, 5G or NR. In example embodiments, apparatus 10 may be an eNB in LTE (e.g., MeNB) or gNB in 5G (e.g., SgNB).

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagrams illustrated in FIGS. 2-3. In some embodiments, apparatus 10 may be configured to perform a procedure for reducing latency in NR.

For instance, in one embodiment, apparatus 10 may be controlled by memory 14 and processor 12 to determine or decide to apply selective reordering of one or more data units transmitted to a receiving (PDCP) entity or UE. According to one embodiment, apparatus 10 may be controlled by memory 14 and processor 12 to indicate to the UE that the data unit(s) is flagged for selective reordering. In one example, the data unit(s) may be a PDCP data PDU or SDU. In an embodiment, the application of selective reordering temporarily alters the PDCP window behavior in the UE such that a PDCP layer in the UE is caused to deliver, to upper layer(s), all stored data units with an associated count value that is less than the count value associated with the data unit flagged for selective reordering and/or all stored data units with consecutively associated count value(s) starting from the count value associated with the data unit flagged for selective reordering.

In one embodiment, apparatus 10 may be controlled by memory 14 and processor 12 to indicate that the data unit is flagged for selective reordering by using an R bit in the (PDCP) header of the data unit. In another example embodiment, apparatus 10 may be controlled by memory 14 and processor 12 to indicate that the data unit is flagged for selective reordering by signaling, via RRC signaling, a PDCP SN or corresponding count value based on which to perform the selective reordering once the data unit is received by the UE, e.g., in a HO command or in a PDCP control PDU.

Figure 4B:
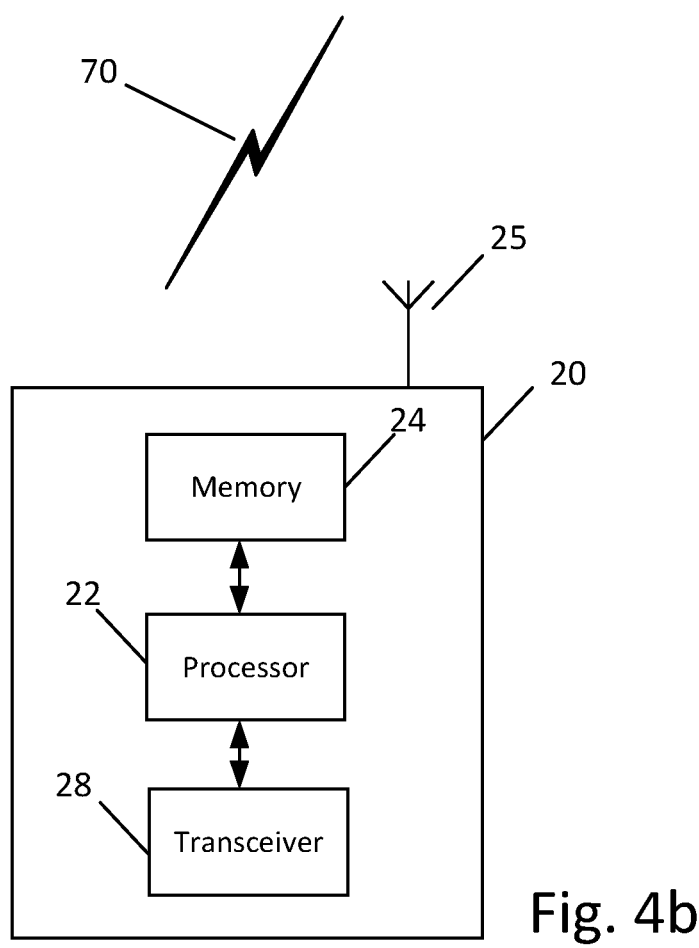
FIG. 4b illustrates an example block diagram of an apparatus, according to an embodiment.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIGS. 2-3. For example, in certain embodiments, apparatus 20 may be configured to perform a procedure for handling reception of data units in a manner that reduces latency.

According to some embodiments, apparatus 20 may be controlled by memory 24 and processor 22 to receive a data unit, e.g., a PDCP data PDU, from lower layer(s). In some embodiments, apparatus 20 may be controlled by memory 24 and processor 22 to determine the count value of the received data unit. According to an embodiment, apparatus 20 may be controlled to determine the count value according to the following rules:

if RCVD_SN<SN(RX_DELIV)−Window_Size, then RCVD_HFN=HFN(RX_DELIV)+1;
if RCVD_SN>=SN(RX_DELIV)+Window_Size, then RCVD_HFN=HFN(RX_DELIV)−1; or
if RCVD_HFN=HFN(RX_DELIV), then RCVD_COUNT=[RCVD_HFN, RCVD_SN].

After determining the count value of the received data unit, in some embodiments, apparatus 20 may be controlled to perform deciphering and integrity verification of the data unit using COUNT=RCVD_COUNT. If the integrity verification fails, then apparatus 20 may be controlled to indicate the integrity verification failure to upper layer(s) and to discard the data unit. In one embodiment, if RCVD_COUNT<RX_DELIV or if the data unit with COUNT=RCVD_COUNT has been received before, apparatus 20 may be controlled to store the data unit to a reception buffer. According to certain embodiments, apparatus 20 may be controlled to determine whether the count value of the received data unit is flagged for selective reordering. In an embodiment, the received data unit may be flagged for selective reordering by using an R bit in the (PDCP) header of the received data unit. In a further embodiment, a PDCP SN or corresponding count value based on which to perform the selective reordering once the data unit is received may be signaled via RRC signalling, e.g., in a HO command or in a PDCP control PDU.

When it is determined that the count of the received data unit was flagged for selective reordering, then apparatus 20 may be controlled to deliver to upper layer(s) all stored data units with an associated count value that is less than the count value associated with the data unit flagged for selective reordering and/or to deliver all stored data units with consecutively associated count value(s) starting from the count value associated with the data unit flagged for selective reordering. In an embodiment, the stored data units may be PDCP SDU(s). According to an embodiment, apparatus 20 may be controlled by memory 24 and processor 22 to deliver, to the upper layer(s), the stored data units is ascending order of the associated count value, for example, after performing header decompression. In one example embodiment, after delivering the stored data units, apparatus 20 may be controlled by memory 24 and processor 22 to update RX_DELIV to the count value of the first data unit which has not been delivered to upper layers, with COUNT value>RCVD_COUNT, and to return to the normal behaviour before the selective reordering.

Therefore, certain example embodiments provide several technical improvements, enhancements, and/or advantages. For example, certain embodiments provide methods for handling gaps in received PDUs in NR. According to example embodiments, for example, 5G systems can be improved so that latency is reduced. For instance, certain embodiments provide methods that allow a network node (e.g., gNB) to temporarily alter the PDCP window behavior in the UE. With such control, the network node is then able to reduce latency whenever PDCP SNs are known to be missing. This provides for better mobility and QoS flow relocation.

As such, example embodiments may improve power efficiency, performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

We claim:

1. An apparatus, comprising:
at least one processor; and
  at least one memory comprising computer program code,
  the at least one memory and computer program code configured, with the at least one processor, to cause the apparatus at least to
  determine to apply selective reordering of data units at a user equipment;
  indicate the decision to apply selective reordering to the user equipment; and
  indicate the decision to apply the selective reordering in an R bit of a header of the data unit,
  wherein the selective reordering temporarily alters packet data convergence protocol window behavior in the user equipment such that a packet data convergence protocol layer in the user equipment delivers, to upper layer(s), at least one of stored data units with an associated count value that is less than the count value associated with a data unit at the user equipment or stored data units with consecutively associated count values starting from the count value associated with a data unit at the user equipment.

2. The apparatus according to claim 1, wherein the data unit comprises at least one of a packet data convergence protocol (PDCP) protocol data unit (PDU) or a packet data convergence protocol (PDCP) service data unit (SDU).

3. The apparatus according to claim 1, wherein the at least one memory and computer program code are configured, with the at least one processor, to cause the apparatus at least to indicate the decision to apply the selective reordering by signaling the sequence number or corresponding count value of the data unit based on which to perform selective reordering.

4. The apparatus according to claim 3, wherein the signaling comprises signaling in at least one of a handover command or control protocol data unit.

5. A method, comprising:
  determining, by a network node, to apply selective reordering of data units at a user equipment; and
  indicating the decision to apply selective reordering to the user equipment,
  wherein the selective reordering temporarily alters packet data convergence protocol window behavior in the user equipment such that a packet data convergence protocol layer in the user equipment delivers, to upper layer(s), at least one of stored data units with an associated count value that is less than the count value associated with a data unit at the user equipment or stored data units with consecutively associated count values starting from the count value associated with a data unit at the user equipment, and
  wherein the indicating comprises indicating the decision to apply the selective reordering in an R bit of a header of the data unit.

6. The method according to claim 5, wherein the data unit comprises at least one of a packet data convergence protocol (PDCP) protocol data unit (PDU) or a packet data convergence protocol (PDCP) service data unit (SDU).

7. The method according to claim 5, wherein the indicating comprises signaling the sequence number or corresponding count value of the data unit based on which to perform selective reordering.

8. The method according to claim 7, wherein the signaling comprises signaling in at least one of a handover command or control protocol data unit.

9. A non-transitory computer readable medium comprising program instructions stored thereon for performing at least the method according to claim 5.

10. An apparatus, comprising:
  at least one processor; and
  at least one memory comprising computer program code,
  the at least one memory and computer program code configured, with the at least one processor, to cause the apparatus at least to
  receive a data unit from at least one lower layer; and
    determine whether the received data unit is flagged for selective reordering;
  determine whether the received data unit is flagged for selective reordering from an R bit of a header of the data unit; and
  when it is determined that the received data unit is flagged for selective reordering,
  deliver, to at least one upper layer, at least one of stored data units with an associated count value that is less than the count value associated with the data unit flagged for selective reordering received at the user equipment or stored data units with consecutively associated count values starting from the count value associated with the data unit flagged for selective reordering received at the user equipment.

11. The apparatus according to claim 10, wherein the data unit comprises at least one of a packet data convergence protocol (PDCP) protocol data unit (PDU) or a packet data convergence protocol (PDCP) service data unit (SDU).

12. The apparatus according to claim 10, wherein the at least one memory and computer program code are configured, with the at least one processor, to cause the apparatus at least to determine whether the received data unit is flagged for selective reordering by receiving a sequence number or corresponding count value of the data unit based on which to perform selective reordering.

13. The apparatus according to claim 12, wherein the receiving comprises receiving the sequence number or corresponding count value of the data unit in at least one of a handover command or control protocol data unit.

14. The apparatus according to claim 10, wherein the at least one memory and computer program code are configured, with the at least one processor, to cause the apparatus at least to deliver the stored data units ascending order of the associated count value.

15. The apparatus according to claim 10, wherein the at least one memory and computer program code are configured, with the at least one processor, to cause the apparatus at least to, after delivering the stored data units, return to normal packet data convergence protocol window behavior.

16. A method, comprising:
  receiving a data unit from at least one lower layer; and
  determining whether the received data unit is flagged for selective reordering; and
  when it is determined that the received data unit is flagged for selective reordering,
  delivering, to at least one upper layer, at least one of stored data units with an associated count value that is less than the count value associated with the data unit flagged for selective reordering received at the user equipment or stored data units with consecutively associated count values starting from the count value associated with the data unit flagged for selective reordering received at the user equipment,
  wherein the determining comprises determining whether the received data unit is flagged for selective reordering from an R bit of a header of the data unit.

17. The method according to claim 16, wherein the data unit comprises at least one of a packet data convergence protocol (PDCP) protocol data unit (PDU) or a packet data convergence protocol (PDCP) service data unit (SDU).

18. The method according to claim 16, wherein the determining comprises determining whether the received data unit is flagged for selective reordering by receiving a sequence number or corresponding count value of the data unit based on which to perform selective reordering.

19. The method according to claim 18, wherein the receiving comprises receiving the sequence number or corresponding count value of the data unit in at least one of a handover command or control protocol data unit.

20. The method according to claim 16, wherein the delivering further comprises delivering the stored data units ascending order of the associated count value.

21. The method according to claim 16, further comprising, after delivering the stored data units, returning to normal packet data convergence protocol window behavior.

* * * * *